(12) United States Patent
Molnar et al.

(10) Patent No.: US 8,508,544 B1
(45) Date of Patent: Aug. 13, 2013

(54) SMALL PRIMITIVE DETECTION TO OPTIMIZE COMPRESSION AND DECOMPRESSION IN A GRAPHICS PROCESSOR

(75) Inventors: Steven E. Molnar, Chapel Hill, NC (US); Franklin C. Crow, Portola Valley, CA (US)

(73) Assignee: NVIDIA Corporation, Santa Clara, CA (US)

( * ) Notice: Subject to any disclaimer, the term of this patent is extended or adjusted under 35 U.S.C. 154(b) by 1385 days.

(21) Appl. No.: 11/593,368

(22) Filed: Nov. 2, 2006

(51) Int. Cl.
*G06T 9/00* (2006.01)

(52) U.S. Cl.
USPC .......................................... 345/555; 345/422

(58) Field of Classification Search
USPC ................................. 345/555, 422
See application file for complete search history.

(56) References Cited

U.S. PATENT DOCUMENTS

| 6,825,847 | B1 * | 11/2004 | Molnar et al. ................ 345/555 |
| 7,692,659 | B1 | 4/2010 | Molnar et al. |
| 2006/0170703 | A1 * | 8/2006 | Liao .............................. 345/613 |
| 2012/0183215 | A1 | 7/2012 | Van Hook et al. |

* cited by examiner

*Primary Examiner* — Maurice L McDowell, Jr.

(57) ABSTRACT

A method and system for selective enablement of tile compression. The method includes receiving a graphics primitive for processing in a set-up unit of a graphics processor and determining a primitive characteristic that indicates a probability of whether a final compression of a tile related to the primitive will be retained. Compression for the tile related to the primitive is allowed when the characteristic indicates the final compression will be retained. Compression for the tile related to the primitive is disallowed in the characteristic indicates the final compression will not be retained.

20 Claims, 8 Drawing Sheets

SMALL PRIMITIVE DETECTION TO OPTIMIZE COMPRESSION AND DECOMPRESSION IN A GRAPHICS PROCESSOR

FIELD OF THE INVENTION

The present invention is generally related to hardware accelerated graphics computer systems.

BACKGROUND OF THE INVENTION

Recent advances in computer performance have enabled graphic systems to provide more realistic graphical images using personal computers, home video game computers, handheld devices, and the like. In such graphic systems, a number of procedures are executed to "render" or draw graphic primitives to the screen of the system. A "graphic primitive" is a basic component of a graphic picture, such as a point, line, polygon, or the like. Rendered images are formed with combinations of these graphic primitives. Many procedures may be utilized to perform 3-D graphics rendering.

Specialized graphics processing units (e.g., GPUs, etc.) have been developed to optimize the computations required in executing the graphics rendering procedures. The GPUs are configured for high-speed operation and typically incorporate one or more rendering pipelines. Each pipeline includes a number of hardware-based functional units that are optimized for high-speed execution of graphics instructions/data, where the instructions/data are fed into the front end of the pipeline and the computed results emerge at the back end of the pipeline. The hardware-based functional units, cache memories, firmware, and the like, of the GPU are optimized to operate on the low-level graphics primitives (e.g., comprising "points", "lines", "triangles", etc.) and produce real-time rendered 3-D images.

A problem exists however with the ability of prior art 3-D rendering architectures to scale to handle the increasingly complex 3-D scenes of today's applications. Computer screens now commonly have screen resolutions of 1920× 1200 pixels or larger. Traditional methods of increasing 3-D rendering performance, such as, for example, increasing clock speed, have negative side effects such as increasing power consumption and increasing the heat produced by the GPU integrated circuit die.

One traditional method for increasing 3-D rendering performance involves compression schemes that reduce the bandwidth required between graphics memory and the GPU. For example, a significant compression of data that must be written and read to/from local graphics memory yields a corresponding significant increase in the effective data transfer bandwidth between the GPU and its graphics memory.

For example, some conventional GPUs compress depth values, or z values, prior to writing them into the z buffer and decompress the z values after reading them from the z buffer. The compression and decompression operations require additional overhead computations, beyond the typical z data processing (e.g., to perform hidden surface removal, etc.). The additional computations may require dedicated logic used only for that purpose or the additional computation may be performed using general purpose logic. In either case, the performance or efficiency of the GPU and the ability of the GPU architecture to scale as graphics applications require is negatively impacted.

More particularly, in a case where a given computer system permits compression of tiles (e.g., groups of pixels) containing multiple primitives, when a new primitive is received, it can be compressed in a multi-primitive format. The multi-primitive compression is expensive in terms of processing cycles. If the primitives are too small, as more primitives are rendered, eventually the tile will no longer be able to be compressed and it will need to be stored in memory uncompressed. Since each update of a compressed, partially-covered tile requires a read of the previously compressed data (⅛ to ¼ of the full, uncompressed tile size), plus a write of the compressed data, this is more expensive than just writing the uncompressed data. This leads to the consequence that, if the tile ends up uncompressed in the end, it would have been more efficient to decompress the tile as soon as possible, and not wait until the tile bursts the limit of the compressed representation.

Thus, a need exists for compression and decompression methods that reduce the bandwidth used by a graphics processor accessing graphics memory and minimizes the number of additional overhead computations needed to support compression/decompression.

SUMMARY OF THE INVENTION

Embodiments of the present invention provide a method and system for a compression and decompression process that reduces the bandwidth used by a graphics processor accessing graphics memory and minimizes the number of additional overhead computations needed to support compression/decompression.

In one embodiment, the present invention is implemented as a method for the selective enablement of tile compression. The method includes receiving a graphics primitive for processing in a set-up unit of a graphics processor and determining a primitive characteristic that indicates a probability of whether a final compression of a tile related to the primitive will be retained. Compression for the tile related to the primitive is allowed when the characteristic indicates the final compression will be retained. Compression for the tile related to the primitive is disallowed in the characteristic indicates the final compression will not be retained.

In one embodiment, the primitive characteristic is based on the length of the edges of the primitive, whereby primitives having short edges are small thus increasing the likelihood that additional primitives will be written to the tile and overflow a compression threshold. In one embodiment, the primitive characteristic is based on estimated screen area of the primitive, whereby primitives having small screen area increase the likelihood that additional primitives will be written to the tile and overflow a compression threshold. In other embodiments, different primitive characteristics can be utilized (e.g., where the selected/utilized characteristic provides an indication of the likelihood of compression threshold overflow).

In so doing, the overhead involved in the compression process can be avoided for those primitives which would yield unfavorable conditions, such as, for example, small primitives with more than one edge intersecting a given tile. Similarly, the performance gains can be obtained for those primitives which would yield favorable conditions, such as, for example, a given tile having one edge from one primitive intersecting, or an abutting edge from two primitives intersecting. In this manner, embodiments of the present invention can reduce the bandwidth used by the GPU accessing its graphics memory and minimize the number of additional overhead computations needed to support the compression/decompression.

BRIEF DESCRIPTION OF THE DRAWINGS

The present invention is illustrated by way of example, and not by way of limitation, in the figures of the accompanying drawings and in which like reference numerals refer to similar elements.

DETAILED DESCRIPTION OF THE INVENTION

Figure 1:
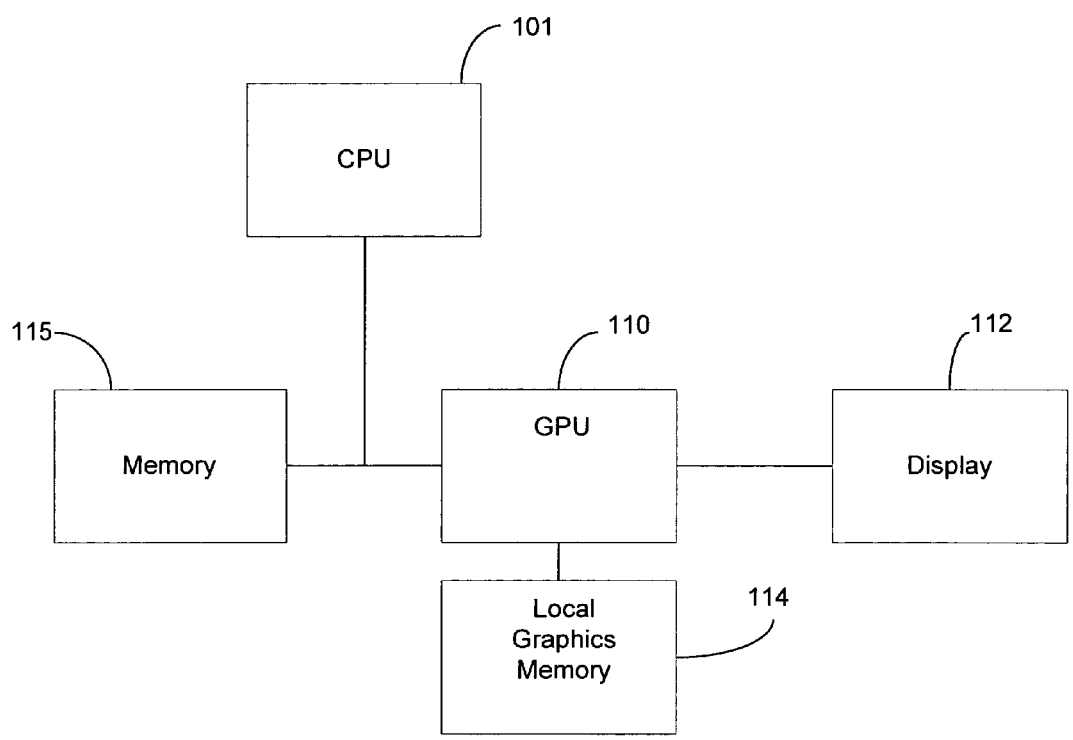
FIG. 1 shows a computer system in accordance with one embodiment of the present invention.

Reference will now be made in detail to the preferred embodiments of the present invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of embodiments of the present invention, numerous specific details are set forth in order to provide a thorough understanding of the present invention. However, it will be recognized by one of ordinary skill in the art that the present invention may be practiced without these specific details. In other instances, well-known methods, procedures, components, and circuits have not been described in detail as not to unnecessarily obscure aspects of the embodiments of the present invention.

Notation and Nomenclature:

Some portions of the detailed descriptions, which follow, are presented in terms of procedures, steps, logic blocks, processing, and other symbolic representations of operations on data bits within a computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "accessing" or "executing" or "storing" or "rendering" or the like, refer to the action and processes of a computer system (e.g., computer system 100 of FIG. 1), or similar electronic computing device, that manipulates and transforms data represented as physical (electronic) quantities within the computer system's registers and memories into other data similarly represented as physical quantities within the computer system memories or registers or other such information storage, transmission or display devices.

Computer System Platform:

FIG. 1 shows a computer system 100 in accordance with one embodiment of the present invention. Computer system 100 depicts the components of a basic computer system in accordance with embodiments of the present invention providing the execution platform for certain hardware-based and software-based functionality. In general, computer system 100 comprises at least one CPU 101, a system memory 115, and at least one graphics processor unit (GPU) 110. The CPU 101 can be coupled to the system memory 115 via a bridge component/memory controller (not shown) or can be directly coupled to the system memory 115 via a memory controller (not shown) internal to the CPU 101. The GPU 110 is coupled to a display 112. One or more additional GPUs can optionally be coupled to system 100 to further increase its computational power. The GPU(s) 110 is coupled to the CPU 101 and the system memory 115. The GPU 110 can be implemented as a discrete component, a discrete graphics card designed to couple to the computer system 100 via a connector (e.g., AGP slot, PCI-Express slot, etc.), a discrete integrated circuit die (e.g., mounted directly on a motherboard), or as an integrated GPU included within the integrated circuit die of a computer system chipset component (not shown). Additionally, a local graphics memory 114 can be included for the GPU 110 for high bandwidth graphics data storage.

System 100 can be implemented as, for example, a desktop computer system or server computer system having a powerful general-purpose CPU 101 coupled to a dedicated graphics rendering GPU 110. In such an embodiment, components can be included that add peripheral buses, specialized audio/video components, IO devices, and the like. Similarly, system 100 can be implemented as a handheld device (e.g., cellphone, etc.) or a set-top video game console device such as, for example, the Xbox®, available from Microsoft Corporation of Redmond, Wash., or the PlayStation3®, available from Sony Computer Entertainment Corporation of Tokyo, Japan. System 100 can also be implemented as a "system on a chip", where the electronics (e.g., the components 101, 115, 110, 114, and the like) of a computing device are wholly contained within a single integrated circuit die. Examples include a hand-held instrument with a display, a car navigation system, a portable entertainment system, and the like.

EMBODIMENTS OF THE INVENTION

Embodiments of the present invention implement a method and system for a compression and decompression process that reduces the bandwidth used by a graphics processor accessing graphics memory and minimizes the number of additional overhead computations needed to support compression/decompression. In one embodiment, the present invention comprises a GPU based method for small primitive detection to optimize a compression/decompression process implemented by the GPU. The method includes receiving a graphics primitive for processing in a set-up unit of the GPU (e.g., GPU 110) and evaluating a plurality of edges of the primitive (e.g., generally a triangle polygon). A determination is made as to whether one edge of the plurality of edges is below a compression threshold. If all edges are above the compression threshold, compression for a tile related to the primitive is allowed. If the one edge is below the compression threshold, compression is disallowed. In one embodiment, the compression reduces the space needed for depth values. In another embodiment, the compression reduces the space needed for color values.

In general, each tile comprises a group of adjacent pixels (e.g., an 8×8 block of pixels, two blocks of 8×8 pixels, one block of 32×32 pixels, etc.). A tile is considered related to the graphics primitive if it has at least some degree of coverage by a graphics primitive. Each tile is subsequently rasterized to determine the related pixels of each tile (e.g., those pixels of the tile that have some degree of coverage). The compression process is able to compress certain parameters of each of the pixels or samples of the tile on a per tile basis. In one embodiment, the compression process compresses depth values (e.g., z values) for each of the pixels or samples on a per tile basis (e.g., a mathematical z plane equation representation that can compactly represent the parameters for each of the pixels of the tile). In other embodiments, the compression process is tailored for color compression, or other rendered data compression.

In so doing, the overhead involved in the compression process can be avoided for those primitives which would yield unfavorable conditions, such as, for example, small primitives with more than one edge intersecting a given tile. Similarly, the performance gains can be obtained for those primitives which would yield favorable conditions, such as, for example, a given tile having one edge from one primitive intersecting, or an abutting edge from two primitives intersecting.

For example, in a case where a given computer system permits compression of tiles containing multiple primitives, when a new primitive is received, and intelligent decision can be made as to whether it should be compressed into a multi-primitive format. This decision is based upon whether it is likely that subsequently arriving primitives will cause the tile to overflow the limit of the compressed multi-primitive representation. For example, if the received primitives are too small (e.g., small primitives with more than one edge intersecting a given tile), the likelihood is high that as more primitives are rendered, eventually the tile will no longer be able to be compressed and it will need to be stored uncompressed. Embodiments of the present invention utilize this characteristic to minimize number of wasted GPU cycles spent compressing tiles which will eventually need to be stored uncompressed.

In one embodiment, the primitive characteristic, which controls the decision to allow or disallow tile compression, comprises the length of the edges of the primitive, whereby primitives having short edges are small thus increasing the likelihood that additional primitives will be written to the tile and overflow a compression threshold. In an alternative embodiment, the primitive characteristic comprises an estimated screen area of the primitive, whereby primitives having small screen area increase the likelihood that additional primitives will be written to the tile and overflow a compression threshold. It should be noted that one skilled in the art will recognize that other primitive characteristics could be used to predict the compressibility of a tile, and that these characteristics are within the scope of the present invention. Embodiments of the present invention and their benefits are further described below.

Figure 2:
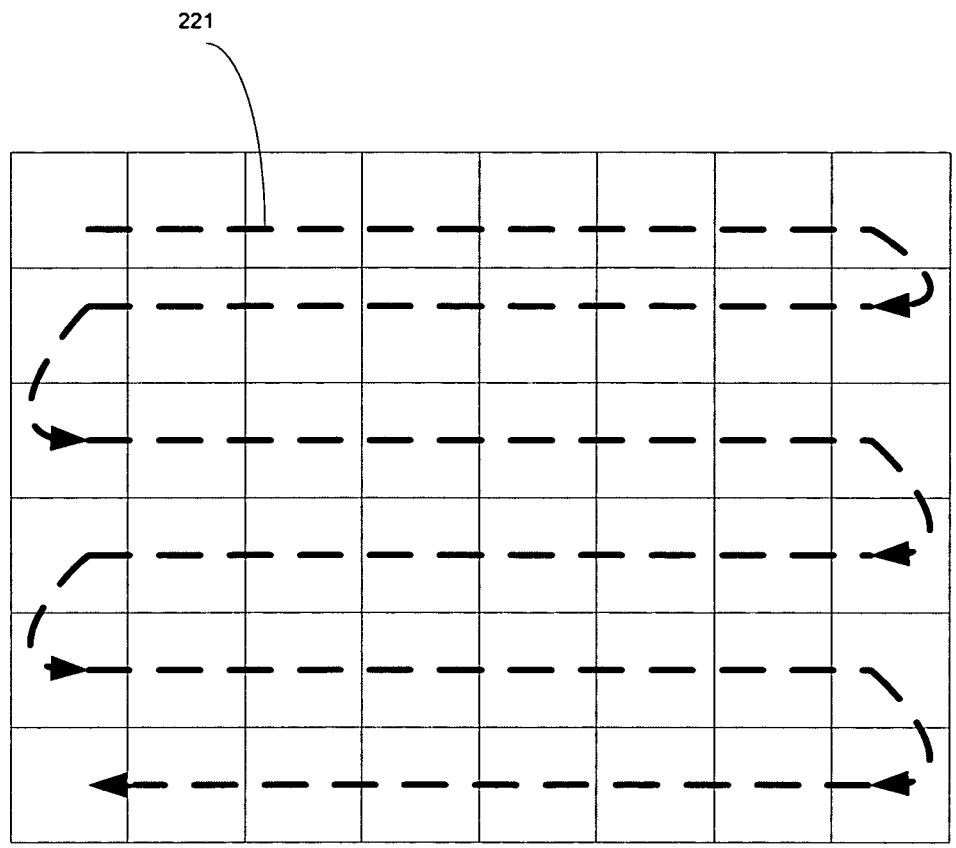
FIG. 2 shows a diagram depicting a grid of pixels being rasterized in a boustrophedonic pattern in accordance with one embodiment of the present invention.

FIG. 2 shows a diagram depicting a grid of tiles (e.g., where each tile is composed of pixels) being rasterized in a boustrophedonic pattern in accordance with one embodiment of the present invention.

In one embodiment, as depicted in FIG. 2, a raster stage of the GPU 110 utilizes a boustrophedonic pattern for traversing a graphics primitive, as indicated by the dotted line 221. In such an embodiment, each tile of the grid of tiles is traversed in the order indicated by the line 221. The line 221 shows a boustrophedonic pattern of traversal, where the term "boustrophedonic" refers to a traversal pattern which visits all tiles on a 2D area by scanning back and forth along one axis as each pass moves farther along on the orthogonal axis, much as a farmer would plow or mow a field.

Thus, as depicted in FIG. 2, the boustrophedonic rasterization traces out serpentine pattern that folds back and forth along a predominant axis. In the FIG. 2 example, the predominant axis is horizontal. A horizontal boustrophedonic sequence, for example, may generate all the tiles within a primitive triangle that are on one row from left to right, and then generate the next row right to left, and so on. Such a folded path ensures that an average distance from a generated tile to recently previously generated tile is relatively small, which has advantages for maintaining a cache of relevant data and reducing the memory requests required for frame buffer and texture access. Additionally, it should be noted that the boustrophedonic traversal pattern can be implemented on a pixel-by-pixel basis (e.g., from a generated pixel to a recently previously generated pixel) as opposed to a tile-by-tile basis.

Additional details regarding boustrophedonic pattern rasterization can be found in U.S. patent application "A GPU HAVING RASTER COMPONENTS CONFIGURED FOR USING NESTED BOUSTROPHEDONIC PATTERNS TO TRAVERSE SCREEN AREAS" by Franklin C. Crow et al., Ser. No. 11/304,904, filed on Dec. 15, 2005, which is incorporated herein in its entirety.

It should be noted that although embodiments of the present invention are described in the context of boustrophedonic rasterization, other types of rasterization patterns can be used. For example, the algorithms and GPU stages described herein for rasterizing tile groups can be readily applied to traditional left-to-right, line-by-line rasterization patterns.

Figure 3:
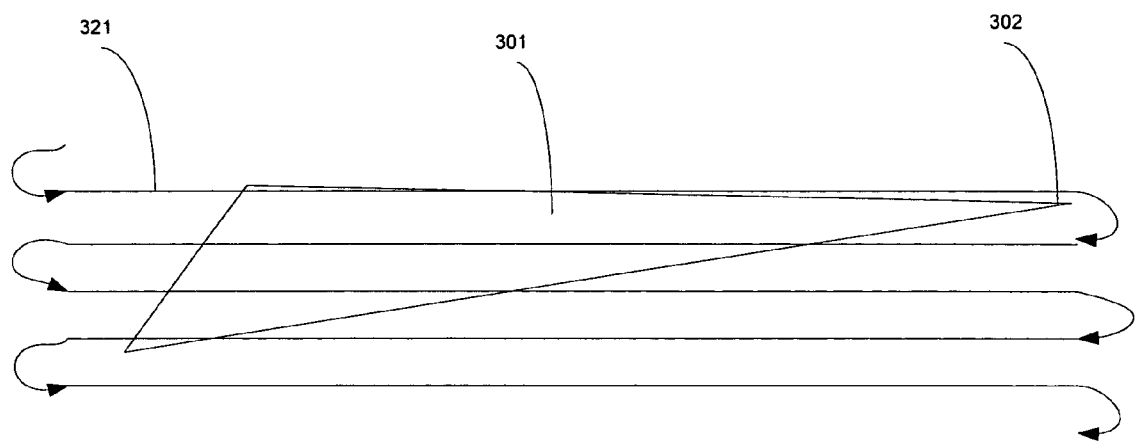
FIG. 3 shows a diagram of a triangle polygon against a rasterization pattern for a raster unit of a GPU in accordance with one embodiment of the present invention.

FIG. 3 shows a diagram of a triangle polygon 301 (e.g., triangle 301) against a rasterization pattern 321 for a raster unit of the GPU 110 in accordance with one embodiment of the present invention.

As described above, the line 321 shows a boustrophedonic pattern of traversal. In the FIG. 3 embodiment, this initial rasterization pattern is performed at a tile based level, or at a coarse rasterization level. A coarse raster unit of the GPU 110 traverses the triangle 301 and stamps out tiles that cover the triangle 301.

Figure 4:
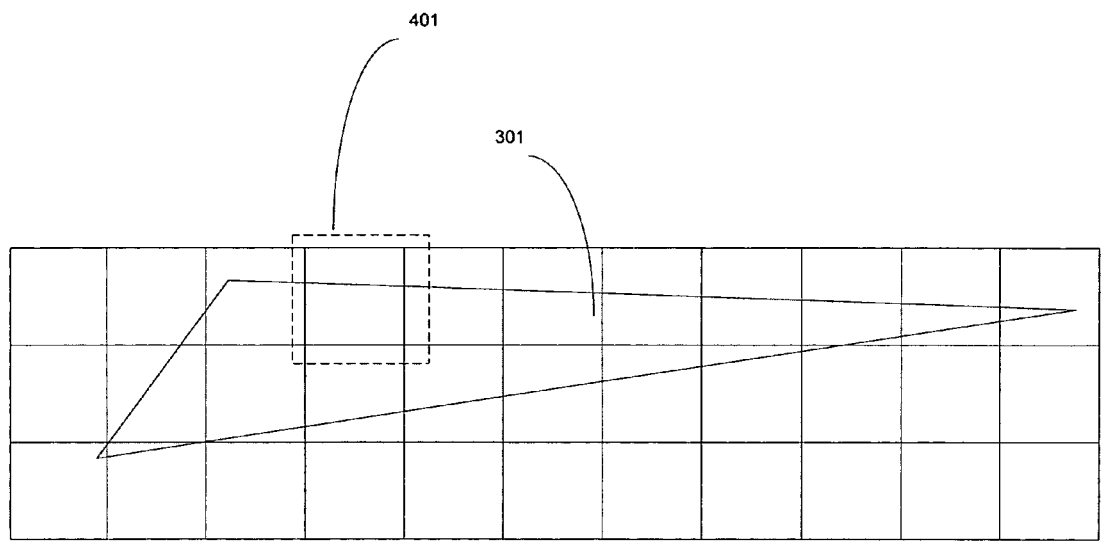
FIG. 4 shows a diagram of the triangle against a grid of tiles as they are being examined by the first level rasterization process in accordance with one embodiment of the present invention.

FIG. 4 shows a diagram of the triangle 301 against a grid of tiles as they are examined by the first level rasterization process in accordance with one embodiment of the present invention. In FIG. 4, each of the illustrated squares represents a tile comprised of pixels (e.g., 32×32, 16×16, 8×8, etc.). As described above, in one embodiment, the rasterization generates a tile (e.g., tile 401) comprising a set of pixels related to the graphics primitive (e.g., a tile that has at least some coverage with respect to the primitive).

Figure 5:
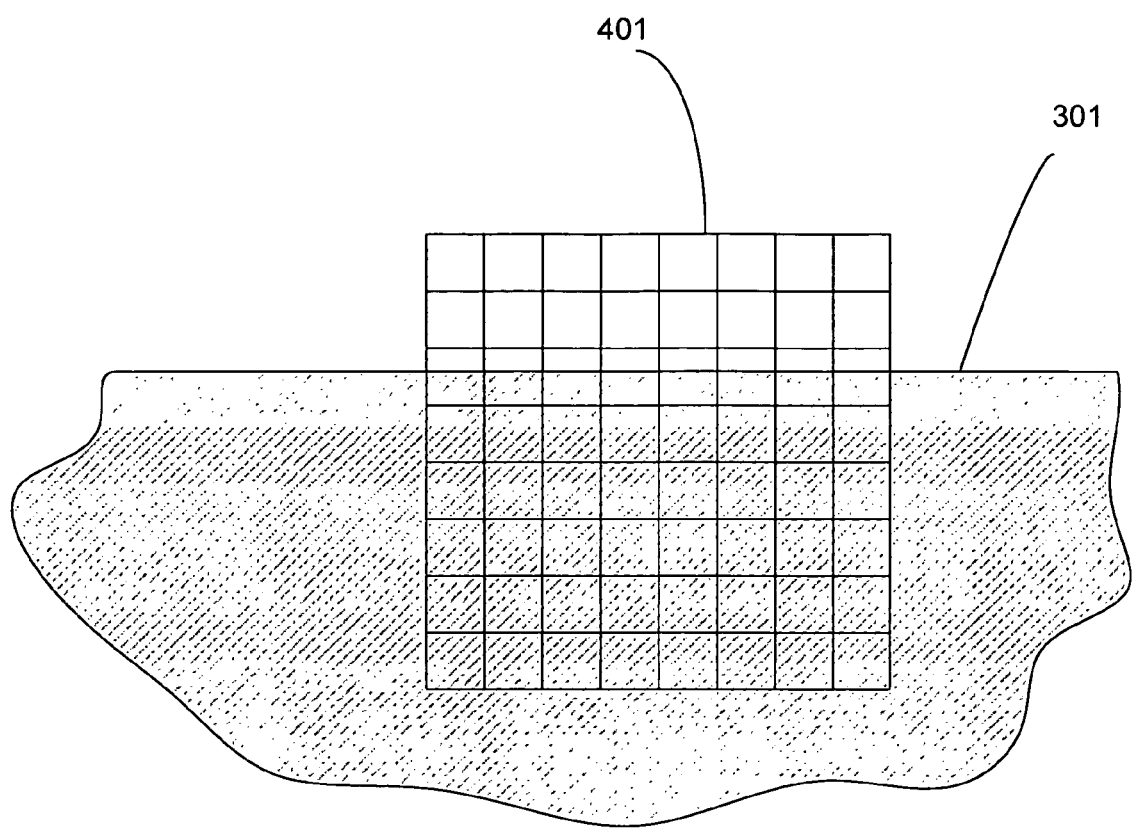
FIG. 5 shows a diagram depicting an exemplary tile from a grid of tiles intersecting a triangle polygon in accordance with one embodiment of the present invention.

FIG. 5 shows a diagram depicting the exemplary tile 401 in greater detail. As illustrated, the tile 401 is partially covered by the triangle 301, a portion of which a shown in FIG. 5. In this example, the exemplary tile 401 is an 8×8 tile and FIG. 5 shows the constituent 64 pixels. It should be noted that tiles having other configurations can be implemented (e.g., 8×16, 32×32, 32×64, etc.).

Thus, the FIG. 5 embodiment shows a case where the tile 401 can be advantageously compressed. As shown in FIG. 5, there is only one edge intersecting the tile 401. Accordingly, a compression algorithm can readily represent a per pixel parameter of each of the 64 pixels in a compressed form since there are at most two surfaces within the tile 401. For example, one surface is the surface of the polygon 301 and the other surface is typically a background surface.

In one embodiment, a depth based compression is implemented. For example, in such an embodiment, when a single z plane (e.g., a single surface), representing a primitive or a background plane completely covers the tile 401, a single z plane equation may be used to represent the z values for each of the pixels within the tile 401. The coefficients for the single plane equation or tile specific coefficients corresponding to the single plane equation are a compressed planar z representation. Similarly, when a single z plane of a primitive covers a portion of the tile 401 (e.g., overlapping either the background or another primitive completely covering the entire tile), or when an edge shared between two abutting primitives lies within the tile 401, the coefficients for the two plane equations (e.g., for the two surfaces) and coverage information may be used to represent the z values within the tile. The coverage information indicates which samples refer to each plane equation. Alternatively, tile specific coefficients corresponding to the two z plane equations and coverage information may be used to represent the z values within the tile. The coefficients for the two plane equations or tile specific coefficients are a compressed planar z representation.

Thus, it is advantageous to compress when there is no more than two z plain equations that pass through a tile (e.g., one z plane equation for a background polygon and one z plane equation for a partially covering polygon, or two z plane equations for respective abutting polygons passing through the tile).

Additional details regarding z-plane compression can be found in commonly assigned U.S. patent application "PLANAR Z REPRESENTATION FOR Z COMPRESSION" by Steven E. Molnar, et al., Ser. No. 10/787,460, filed on Jun. 28, 2004, which is incorporated herein in its entirety.

In this manner, in one embodiment, compression is advantageous as long as there is a single edge intersecting the tile, there is a shared abutting edge intersecting the tile, or the tile is completely covered. In these situations, as described above, it is probable that there will not be additional primitives written to the tile and therefore, the multi-primitive tile compression format will likely be retained. In contrast, as described above, in those cases where there is a small primitive intersecting the tile (e.g., as indicated by multiple edges intersecting the tile, etc.), it is likely that additional primitives will be written to the tile and therefore the multi-primitive compression format will ultimately not be retained. The overhead involved in compression is not advantageous in those situations where ultimately the compression format will have to be undone and the tile written back to memory in an uncompressed format. Situations where it is not advantageous to implement compression are further described in the discussions of FIG. 6 and FIG. 7 below.

Figure 6:
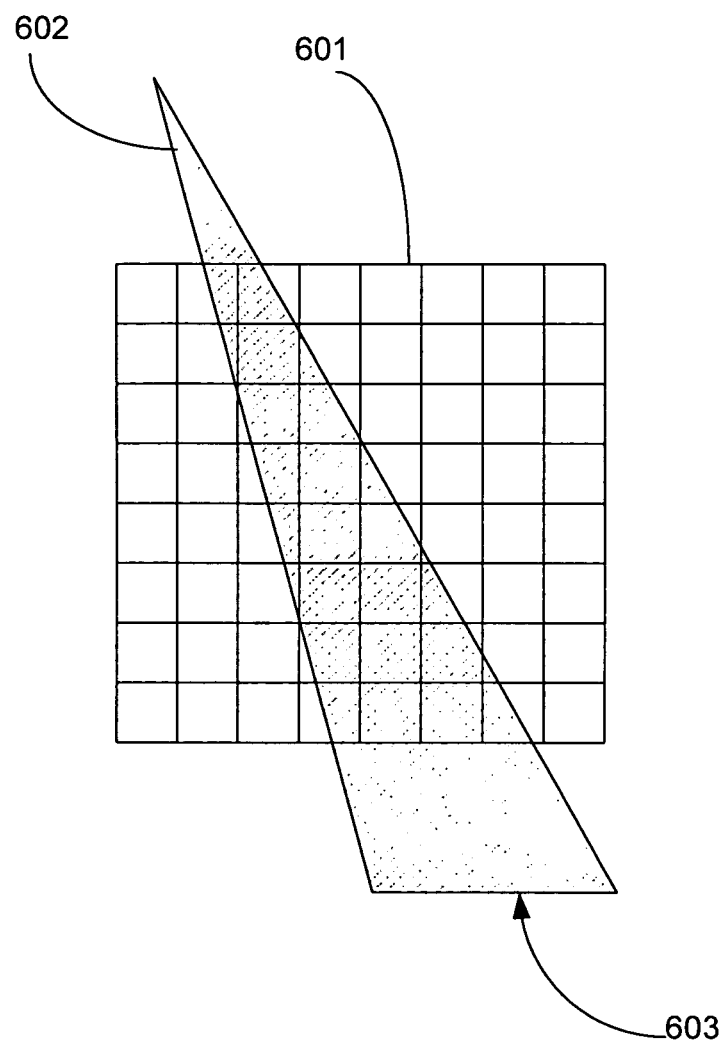
FIG. 6 shows a diagram of a tile and a primitive intersecting the tile in accordance with one embodiment of the present invention.

FIG. 6 shows a diagram of a tile 601 and a primitive 602 intersecting the tile 601 in accordance with one embodiment of the present invention. As described above, if the received primitives are too small, such as where the primitive 602 has more than one edge intersecting the tile 601, the likelihood is high that as more primitives are rendered, eventually the tile will no longer be able to be compressed and will need to be stored uncompressed. Accordingly, it is an objective of embodiments of the present invention to detect such situations.

In one embodiment, a set-up unit of the GPU 110 receives the primitive 602 for processing. The set-up unit (e.g., set-up unit 801 of FIG. 8) evaluates the plurality of edges comprising the primitive and determines whether one edge of the plurality of edges is below a compression threshold. In this case, the primitive 602 includes an edge 603 which is comparatively short compared to the other edges. Generally, those triangles having one edge that is much shorter than the other edges tend to be long and comparatively slender. Such long slender triangles often intersect tiles with both of their long edges as opposed to, for example, triangle 301 which intersects a tile with one of its edges. For example, if the edge 603 is above the compression threshold, compression for the tile 601 is allowed. However, as in this case, if the edge 603 is below the compression threshold, compression is disallowed, and the tile is processed uncompressed.

Figure 7:
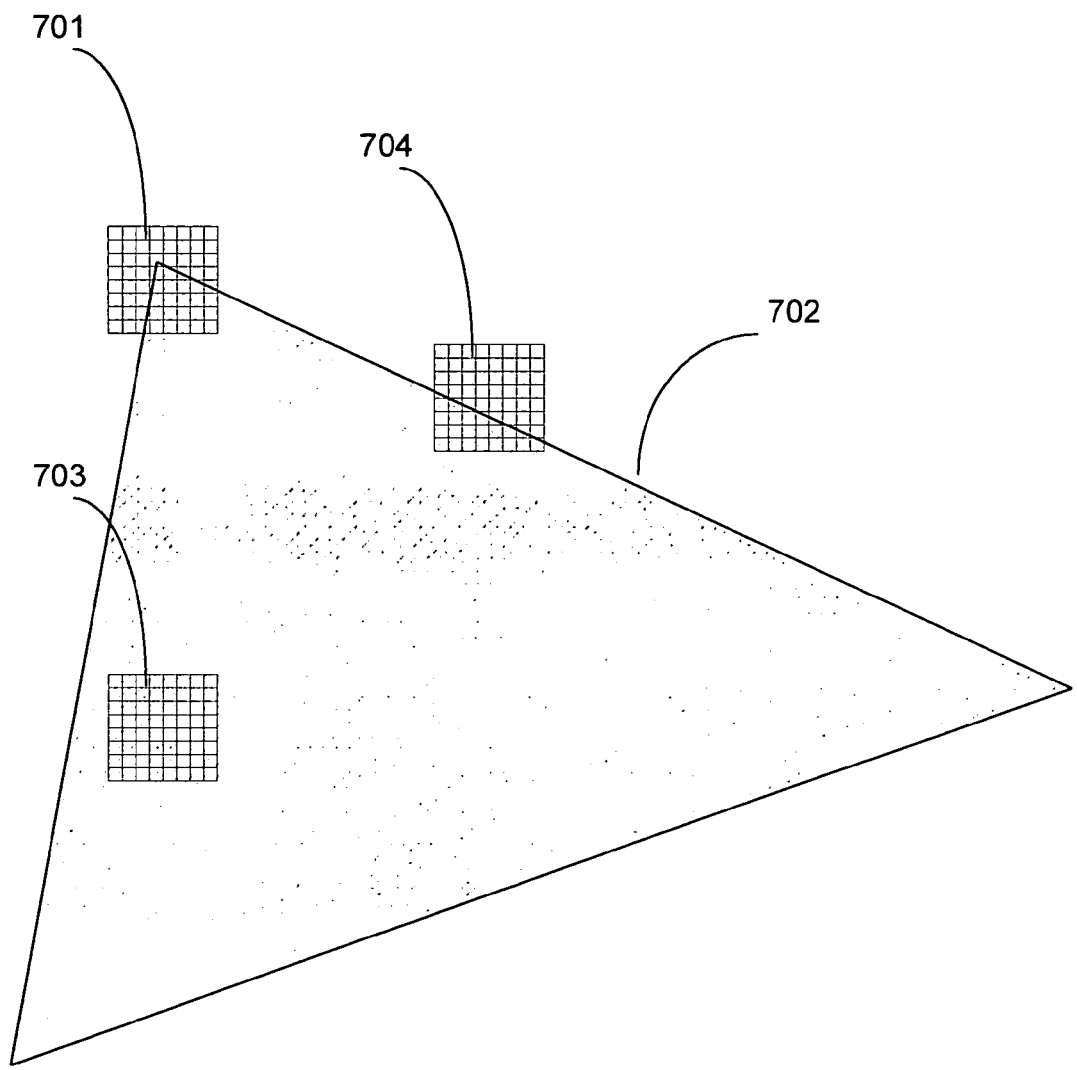
FIG. 7 shows a diagram of an exceptional case whereby a given primitive is comparatively large on each of its constituent edges and yet compression for the tile is not advantageous.

FIG. 7 shows a diagram of an exceptional case whereby a given primitive 702 is comparatively large on each of its constituent edges and yet compression for the tile 701 is not advantageous. FIG. 7 shows an exceptional case where each of the edges of the triangle 702 are comparatively large, and are thus above a compression threshold. However, in this case, one of the vertices of the triangle 702 lies directly within the tile 701, as shown. Since the vertex of the triangle 702 is within the tile and there is a high probability that the triangle 702 is part of a triangle mesh, other triangles of the measure also intersect the tile 701, containing the vertex. Accordingly, the total number primitives would almost certainly exceed the maximum of the two tiles that can be compressed, ultimately forcing decompression, and incurring the overheads described above.

Figure 8:
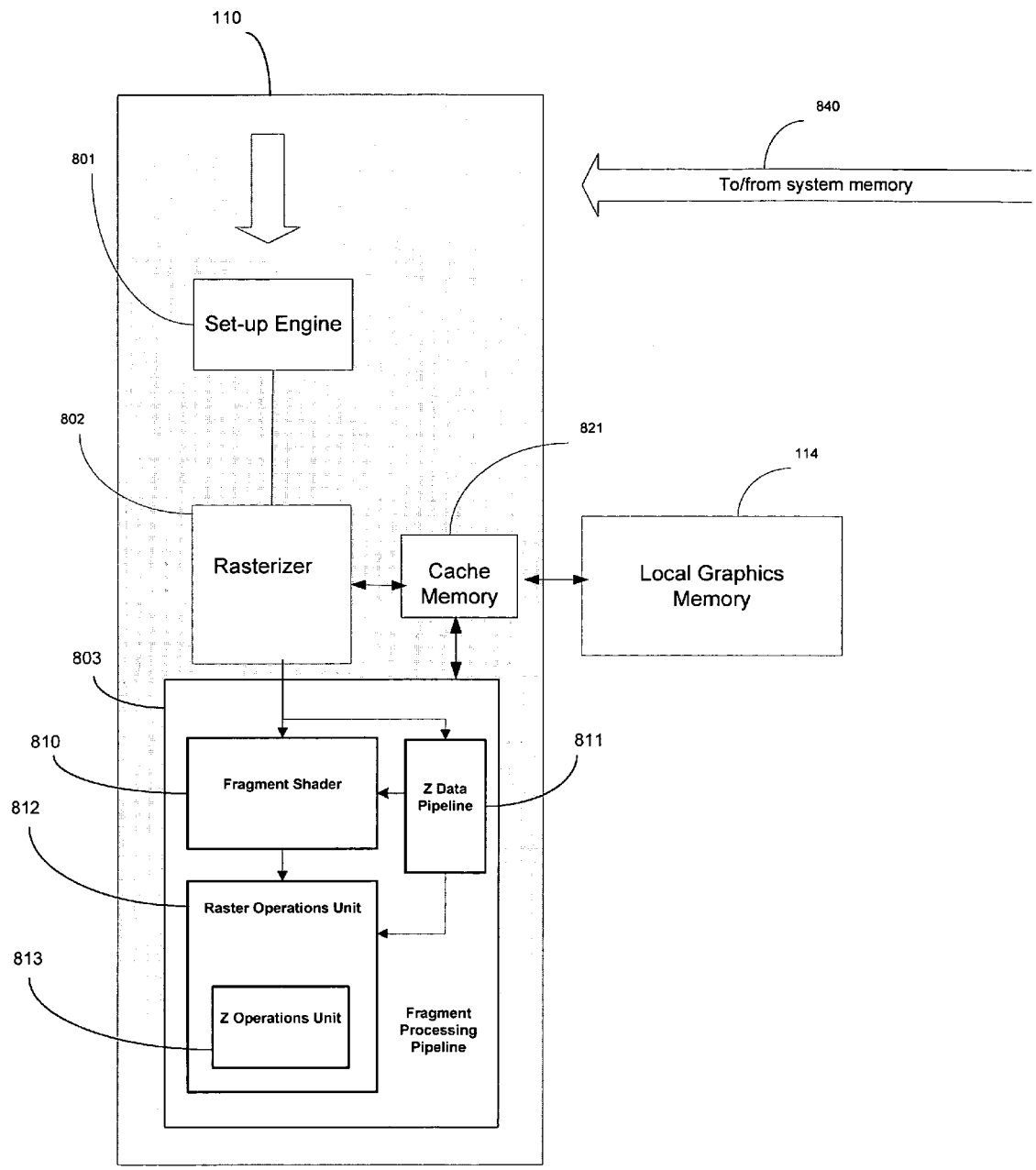
FIG. 8 shows a diagram of internal components of the GPU in accordance with one embodiment of the present invention.

FIG. 8 shows a diagram of internal components of the GPU 110 in accordance with one embodiment of the present invention. As shown in FIG. 8, the GPU 110 includes a set-up unit 801 and a rasterizer unit 802. Generally, the set-up unit 801 functions by converting descriptions based on vertices to descriptions based on edge descriptions. The set-up unit 801 further functions by evaluating a plurality of edges comprising each primitive and determining whether one of the edges is below a compression threshold, as described above. The set-up unit 801 then tags the primitives in accordance with their compression threshold status (e.g., whether they are above or below the threshold), and propagates this tag along with the primitive to subsequent components of the GPU 110.

In one embodiment, the compression threshold is adjustable in accordance with a number of different factors. For example, in one embodiment, the threshold is adjusted based upon a profile of an application executing on the GPU 110. For example, the GPU 110 can be configured to access a data structure (e.g., in system memory, in disk storage, etc.) containing a table of per application profiles, where the profiles provide a customized per application setting for the compression threshold. Alternatively, in one embodiment, the compression threshold can be dynamically adjusted by measuring the amount of overhead incurred as the compression threshold is dynamically adjusted upwards and downwards to determine an optimal "sweet spot".

The rasterizer unit 802 converts the edge descriptions received from set-up unit 801 into filled areas comprising actual pixel descriptions (e.g., pixel areas, pixel sub-samples, etc.). The pixel descriptions are subsequently passed along to the fragment processing pipeline 803 for further processing and rendering.

The rasterizer unit 802 outputs fragment data and fragment program instructions to Fragment Processing Pipeline 803. Rasterizer unit 802 outputs a portion of the fragment data, plane equation data, to a Z Data Pipeline 811. Z Data Pipeline 811 may include a storage resource such as a first-in first-out (FIFO) memory, register file, random access memory (RAM), or the like. As described further herein, the plane equation data includes tile specific z plane equation coefficients defining z values for the fragment within the tile.

The fragment programs configure the Fragment Processing Pipeline 803 to process fragment data by specifying computations and computation precision. Fragment Shader 810 is optionally configured by fragment program instructions such that fragment data processing operations are performed in multiple internal passes within Fragment Shader 810. Fragment Shader 810 computes and processes color values for one or more sub-pixel sample positions using the fragment data. Fragment Shader 810 may also compute z values for one or more sub-pixel sample positions using the plane equation data stored in Z Data Pipeline 811. Alternatively, Fragment Shader 810 may compute z values without using the plane equation data stored in Z Depth Data Pipeline 811.

Fragment Shader 810 outputs the processed fragment data and codewords generated from fragment program instructions to Raster Operations Unit 812. In one embodiment, the raster operations unit implements the compression in accordance with the per tile tags received from the set-up unit 801 as described above.

When necessary, Raster Operations Unit 812 determines sub-pixel z values for each sub-pixel sample position using sub-pixel sample positions specified by the multisample mode. Raster Operations Unit 812 receives the sub-pixel z values (included within the processed fragment data) from Fragment Shader 810 when the fragment program specifies a depth-replace shader. Alternatively, Raster Operations Unit 812 computes the sub-pixel z values as needed to perform hidden surface removal using the plane equation data received from Z Data Pipeline 811.

In one embodiment Raster Operations Unit 812 replicates the processed fragment data, such as color, received from Fragment Shader 810 for each sub-pixel sample position. In another embodiment Raster Operations Unit 812 receives sub-pixel data for each sub-pixel sample from Fragment Shader 810. In yet another embodiment, Raster Operations Unit 812 computes pixel or sub-pixel color values only when necessary dependent on the results of z testing, using plane equation data received from Z Data Pipeline 811 that includes tile specific color plane equation coefficients. Processing sub-pixel color values may reduce color space aliasing resulting from color variations between sub-pixel sample positions within a pixel, further improving image quality. Processing sub-pixel z values allows for proper handling of interpenetrating geometry to minimize bulkhead artifacts.

Raster Operations Unit 812 further includes a Z Operations Unit 813. Raster Operations Unit 812 reads graphics data stored in memory, such as compressed or uncompressed z data and stencil data stored in a z buffer. Z Operations Unit 813 performs z testing using compressed z data. However, in some ambiguous cases, e.g., intersecting primitives, Z Operations Unit 813 decompresses compressed z data as needed to perform z testing. Raster Operations Unit 812 writes graphics data to memory as needed based on the results of the z testing to update the z buffer, and other buffers, such as a frame buffer.

Referring still to FIG. 8, the GPU 110 further includes a cache memory 821 that functions by implementing high-speed low latency storage for the most frequently used graphics rendering data. Such data typically comprises texture information, vertex information, colors, and the like. The cache memory 821 is shown coupled to the local graphics memory 114. The cache memory 821 utilizes one or more cache maintenance mechanisms to maintain coherency with the local graphics memory 114. The arrow 840 shows the communications pathway between the GPU 110 and the system memory (e.g., memory 115 shown in FIG. 1).

The foregoing descriptions of specific embodiments of the present invention have been presented for purposes of illustration and description. They are not intended to be exhaustive or to limit the invention to the precise forms disclosed, and many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A method for selective enablement of tile compression, comprising:
   receiving a graphics primitive for processing in a set-up unit of a graphics processor;
   determining a primitive characteristic related to a compression threshold that indicates a probability of whether a final compression of a tile related to the primitive will be retained;
   allowing compression for the tile related to the primitive when the characteristic indicates the final compression will be retained; and
   disallowing compression for the tile related to the primitive when the characteristic indicates the final compression will not be retained.

2. The method of claim 1, wherein determining the primitive characteristic further comprises:
   determining whether a screen area estimate for the graphics primitive is below a compression threshold;
   allowing compression for the tile if the screen area estimate is above the compression threshold; and
   disallowing compression for the tile if the screen area estimate is below the compression threshold.

3. The method of claim 1, wherein determining the primitive characteristic further comprises:
   evaluating a plurality of edges of the primitive;
   determining whether one edge of the plurality of edges is below a compression threshold;
   allowing compression for a tile related to the primitive if all edges of the primitive are above the compression threshold; and
   disallowing compression if the one edge is below the compression threshold.

4. The method of claim 3, further comprising:
   tagging the primitive for compression if all edges are above the compression threshold, wherein the tagging designates tiles related to the primitive for compression.

5. The method of claim 3, further comprising:
tagging the primitive as uncompressed if the one edge is below the compression threshold, wherein the tagging designates tiles related to the primitive to remain uncompressed.

6. The method of claim 3, wherein the compression for the tile is implemented within a raster operations unit of the graphics processor.

7. The method of claim 3, wherein the compression for the tile is color compression.

8. The method of claim 3, wherein the compression for the tile is depth compression.

9. A method for selective enablement of tile based compression, comprising:
receiving a graphics primitive for processing in a set-up unit of a graphics processor;
evaluating a plurality of edges of the primitive;
determining whether one edge of the plurality of edges is below a compression threshold;
tagging the primitive with a value in accordance with the compression threshold;
implementing compression for a tile related to the primitive if the tagging indicates all edges of the primitive above the compression threshold; and
processing the tile uncompressed if the tagging indicates the one edge is below the compression threshold.

10. The method of claim 9, wherein the compression for the tile is implemented within a raster operations unit of the graphics processor.

11. The method of claim 9, wherein the compression for the tile is color compression.

12. The method of claim 9, wherein the compression for the tile is a rendered parameter compression.

13. The method of claim 9, wherein the compression for the tile is depth compression.

14. The method of claim 13, wherein the depth compression further comprises:
allocating a portion of memory within a z buffer of a local graphics memory for storing z data for a tile;
determining a set of coefficients defining a tile specific plane equation for a primitive intersecting the tile; and
storing the set of coefficients defining the tile specific plane equation for the primitive intersecting the tile.

15. A computer system, comprising:
a system memory;
a central processor unit coupled to the system memory; and
a graphics processor unit communicatively coupled to the central processor unit;
a set-up unit within the graphics processor unit for evaluating a plurality of edges of a primitive and for determining whether one edge of the plurality of edges is below a compression threshold;
a raster unit within the graphics processor unit and coupled to the set-up unit for rasterizing the primitive for determining at least one tile related to the primitive; and
a raster operations unit within the graphics processor unit and coupled to the raster unit for implementing compression for the at least one tile if all edges of the at least one primitive are above a value related to the compression threshold, and for processing the at least one tile uncompressed if the one edge is below the compression threshold.

16. The computer system of claim 15, further comprising:
tagging the primitive for compression if the one edge is above the compression threshold, wherein the tagging designates tiles related to the primitive for compression.

17. The computer system of claim 15, further comprising:
tagging the primitive as uncompressed if the one edge is below the compression threshold, wherein the tagging designates tiles related to the primitive to remain uncompressed.

18. The computer system of claim 15, wherein the compression for the tile is implemented within a raster operations unit of the graphics processor.

19. The computer system of claim 15, wherein the compression for the tile is color compression.

20. The computer system of claim 15, wherein the compression for the tile is depth compression.

* * * * *